United States Patent
Cretors (10) Patent No.: US 9,943,087 B2
(45) Date of Patent: Apr. 17, 2018

(54) MULTI-PURPOSE KETTLES FOR PRODUCING CARAMEL CORN

(71) Applicant: C. Cretors & Company, Wood Dale, IL (US)

(72) Inventor: Charles D. Cretors, Lake Forest, IL (US)

(73) Assignee: C. Cretors & Company, Wood Dale, IL (US)

(*) Notice: Subject to any disclaimer, the term of this patent is extended or adjusted under 35 U.S.C. 154(b) by 0 days.

(21) Appl. No.: 14/478,950

(22) Filed: Sep. 5, 2014

(65) Prior Publication Data

US 2015/0064320 A1 Mar. 5, 2015

Related U.S. Application Data

(60) Provisional application No. 61/874,101, filed on Sep. 5, 2013.

(51) Int. Cl.

| | | |
|---|---|---|
| *A23L 1/18* | (2006.01) | |
| *A23G 3/54* | (2006.01) | |
| *A23G 3/34* | (2006.01) | |
| *A23G 3/26* | (2006.01) | |
| *A23P 30/38* | (2016.01) | |
| *A23P 20/13* | (2016.01) | |

(52) U.S. Cl.
CPC .............. *A23G 3/54* (2013.01); *A23G 3/26* (2013.01); *A23G 3/343* (2013.01); *A23P 20/13* (2016.08); *A23P 30/38* (2016.08)

(58) Field of Classification Search
CPC . A23P 1/083; A23P 1/148; A23G 3/54; A23G 3/343; A23G 3/26
USPC .... 99/323, 323.6–323.9, 323.11, 323.5, 348, 99/420–422, 512, 494, 508, 483, 486, 99/330; 426/290, 295, 307, 625, 445, 426/450, 233
See application file for complete search history.

(56) References Cited

U.S. PATENT DOCUMENTS

| | | |
|---|---|---|
| 884,771 A | 4/1908 | Snow |
| 1,251,291 A | 12/1917 | Scheeffer |
| (Continued) | | |

FOREIGN PATENT DOCUMENTS

| | | |
|---|---|---|
| DE | 8624682 U1 | 1/1987 |
| DE | 20120429 U1 | 8/2002 |
| (Continued) | | |

OTHER PUBLICATIONS

C. Cretors and Co., "Diplomat" product manual for models DI20C, DI32C, DI20F, DI32F, DI205, TDI205, TDI206, DI325 and TDI326; 1996, 58 pages.
C. Cretors and Co., "Diplomat" product manual for models DI20CP, DI32CP, DI20FP and DI32FP; 1989, 62 pages.
C. Cretors and Co.; Multi-product sell sheet for "The New Diplomat Counter Showcase" and "Thunder Kettle" for models G48E, EPR48E5 and PR48E5; dated 1990, 2 pages.
(Continued)

*Primary Examiner* — Phuong Nguyen
(74) *Attorney, Agent, or Firm* — Perkins Coie LLP (57) ABSTRACT

An apparatus for popping corn, cooking candy, and mixing candy and popcorn is disclosed herein. A multi-purpose kettle can include one or more rotatable stir assemblies that can be positioned at the bottom of the kettle to mix the popcorn and/or the popcorn and candy. The kettle can be heated to a first temperature to pop corn kernels and produce popcorn, and heated to a second temperature to cook the candy. In some embodiments, the kettle can be positioned at an angle to mix the popcorn and the candy.

11 Claims, 10 Drawing Sheets

(56) References Cited

U.S. PATENT DOCUMENTS

| | | |
|---|---|---|
| 1,308,241 A | 7/1919 | Hutchinson |
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,575,643 A | 11/1951 | Tamsen |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Dennis |
| 2,907,264 A | 10/1959 | Bushway |
| 2,918,956 A | 12/1959 | Otto |
| 2,939,379 A | 6/1960 | Schmitt |
| 2,984,169 A | 5/1961 | Bushway |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,251,579 A | 5/1966 | Lasar |
| 3,280,720 A | 10/1966 | Kuhn |
| 3,291,304 A | 12/1966 | Fuchs |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley |
| 3,568,782 A | 3/1971 | Cox |
| 3,697,289 A | 10/1972 | Day et al. |
| 3,739,953 A | 6/1973 | Cretors |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf Nee Kiesel et al. |
| 4,173,925 A | 11/1979 | Leon |
| 4,178,843 A | 12/1979 | Crabtree et al. |
| 4,182,229 A | 1/1980 | Vandewalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,438,682 A | 3/1984 | King et al. |
| 4,494,314 A | 1/1985 | Gell |
| 4,512,247 A | 4/1985 | Friedman |
| D285,404 S | 9/1986 | Wang |
| 4,648,719 A | 3/1987 | Roben |
| 4,649,263 A | 3/1987 | Goodlaxson |
| 4,702,158 A | 10/1987 | Ishihara |
| D294,448 S | 3/1988 | Otto |
| 4,763,568 A | 8/1988 | Kiczek |
| 4,881,457 A | 11/1989 | Lyga et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,180,898 A | 1/1993 | Alden et al. |
| 5,203,256 A | 4/1993 | Mueller |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoeberigs |
| 5,332,102 A * | 7/1994 | Sennett .............. B07B 1/02 209/417 |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee |
| 5,513,558 A | 5/1996 | Erickson et al. |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,871,792 A | 2/1999 | Weiss et al. |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |
| 6,234,063 B1 | 5/2001 | Evers et al. |
| 6,374,727 B1 * | 4/2002 | Cretors .............. A23L 1/1815 366/185 |
| 6,382,087 B1 | 5/2002 | Iiyama |
| 6,412,395 B1 | 7/2002 | Weiss et al. |
| 6,412,396 B1 | 7/2002 | Wright |
| 6,460,451 B1 | 10/2002 | Helman et al. |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B1 | 10/2007 | Allington et al. |
| 7,874,244 B1 | 1/2011 | Rhome |
| 8,011,622 B1 | 9/2011 | Guthrie |
| 8,201,492 B2 | 6/2012 | Cretors |
| D672,789 S | 12/2012 | Bongiovanni |
| 8,464,634 B2 | 6/2013 | Cretors et al. |
| 8,794,129 B2 | 8/2014 | Cretors |
| 8,869,679 B2 | 10/2014 | Ryan et al. |
| 9,144,247 B2 | 9/2015 | Cretors |
| 9,408,496 B2 | 8/2016 | Cretors |
| D802,982 S | 11/2017 | Vidojevic |
| 2002/0147006 A1 | 10/2002 | Coon et al. |
| 2003/0159591 A1 | 8/2003 | Evans, Sr. et al. |
| 2003/0168438 A1 | 9/2003 | Zhou |
| 2004/0045444 A1 | 3/2004 | Mann |
| 2004/0074397 A1 | 4/2004 | Calhoun |
| 2004/0265993 A1 | 12/2004 | Darling et al. |
| 2005/0056154 A1 | 3/2005 | Fu |
| 2005/0086814 A1 * | 4/2005 | Huang .............. A47J 43/0722 30/302 |
| 2006/0149415 A1 | 7/2006 | Richards |
| 2009/0041915 A1 | 2/2009 | Biechteler |
| 2009/0056558 A1 * | 3/2009 | Cretors .............. A23L 1/1815 99/323.8 |
| 2009/0126579 A1 | 5/2009 | Cretors et al. |

(56) References Cited

U.S. PATENT DOCUMENTS

| | | |
|---|---|---|
| 2009/0145242 A1* | 6/2009 | Pryor, Jr. ............... G01L 5/009 73/856 |
| 2009/0208621 A1 | 8/2009 | Dotan |
| 2009/0223378 A1 | 9/2009 | Cretors |
| 2010/0270282 A1 | 10/2010 | Fernandez et al. |
| 2011/0014340 A1 | 1/2011 | Spitzley et al. |
| 2011/0076372 A1 | 3/2011 | Cretors |
| 2011/0076373 A1 | 3/2011 | Cretors et al. |
| 2011/0083562 A1 | 4/2011 | Ryan et al. |
| 2011/0120317 A1 | 5/2011 | Rhome |
| 2012/0266756 A1 | 10/2012 | Cretors |
| 2013/0022727 A1 | 1/2013 | Sherwin |
| 2013/0276640 A1 | 10/2013 | Cretors |
| 2013/0276641 A1 | 10/2013 | Vidojevic |
| 2013/0280386 A1 | 10/2013 | Cretors |
| 2017/0290360 A1 | 10/2017 | Vidojevic |

FOREIGN PATENT DOCUMENTS

| | | |
|---|---|---|
| EP | 0364071 | 4/1990 |
| FR | 2401387 A1 | 3/1979 |
| GB | 0688223 | 3/1953 |
| GB | 717654 A | 10/1954 |
| JP | S-59135849 A | 8/1984 |
| JP | 2006081587 A | 3/2006 |
| WO | 9310698 | 6/1993 |
| WO | WO-9706699 A1 | 2/1997 |
| WO | 2004054384 | 7/2004 |
| WO | WO-2012145717 A1 | 10/2012 |

OTHER PUBLICATIONS

Gold Medal Products Co., "Funfood Equipment & Supplies" catalog; vol. 56, dated 2000, 108 pages.

Loeb Equipment 20 Gallon Groen Model DNTA20 Twin Scrape Agitated Jacketed Kettle; www.loebequipment.com, Oct. 31, 2011, 1 page.

Topping & Dispensing Systems, C. Cretors and Company Product Brochure, pp. 36-39, published Oct. 2005, 5 pages.

Topping Systems, C. Cretors and Company, published Nov. 2003, 2 pages.

International Search Report and Written Opinion, PCT/US2012/03459, dated Sep. 20, 2012, 7 pages.

"How to Succeed in the Caramel Corn Business," Gold Medal Products Company, Copyright 2011, gmpopcorn.com, 24 pages.

"Cretors Coater Mixer Tumbler, http://www.cretors.com/store/catalog.asp?item=39&category_id=3".

"International Search Report and Written Opinion; PCT/US2008/075083; dated Nov. 12, 2008; Applicant: C. Cretors and Company, 8 pages."

"International Search Report and Written Opinion; PCT/EP05/009010; dated Jan. 5, 2006; Applicant: Pfister and Pfister, 6 pages."

"International Search Report and Written Opinion; PCT/US10/50442; dated Nov. 23, 2010; Applicant: C. Cretors & Company, 10 pages."

Loeb Equipment. "20 Gallon Groen Model DNTA20 Twin Scrape Agitated Jacketed Kettle." 1982. http://www.loebequipment.com/p-18523-20-gallon-groen-model-dnta20-twin-scrape-agitated-jacketed-kettle.aspx.

\* cited by examiner

MULTI-PURPOSE KETTLES FOR PRODUCING CARAMEL CORN

CROSS-REFERENCE TO RELATED APPLICATION INCORPORATED BY REFERENCE

The present application claims priority to U.S. Provisional Application No. 61/874,101, filed Sep. 5, 2013, and entitled MULTI-PURPOSE KETTLES FOR PRODUCING CARMEL CORN, AND ASSOCIATED METHODS OF MANUFACTURE AND USE, which is herein incorporated by reference in its entirety.

TECHNICAL FIELD

The following disclosure relates generally to candy popcorn makers and, more particularly, to multi-purpose kettles for popping corn and cooking candy coatings/mixing candy popcorn.

BACKGROUND

Candy popcorn, such as caramel popcorn, kettle corn, and other flavors of candy popcorn are widely enjoyed. Conventional methods of making candy popcorn require cooking a candy mixture, popping the popcorn, then mixing the popcorn and the candy together. These steps are traditionally performed using separate containers specialized for each task. For example, popcorn is popped separately in a popcorn popper, the candy coating is cooked in a copper kettle, and a stainless steel mixer is used to mix the popcorn with the candy. This arrangement requires that the hot candy and popcorn be separately transferred to a mixer after the corn is popped and the candy is cooked. The hot candy and the popcorn are then mixed together and subsequently transferred to a cooling and packaging station.

DETAILED DESCRIPTION

The following disclosure describes various embodiments of multi-purpose kettles and associated systems for popping corn and cooking/mixing candy corn. Preparing candy corn or caramel corn in a conventional manner generally requires three separate operations and at least two different machines or containers. First, a popping machine (e.g., a popcorn machine having a popping kettle) is used to pop popcorn. Second, caramel is cooked in a cooking device (e.g., a stainless steel cooking container, a copper cooking container, etc.). Finally, third, the popcorn is combined with the caramel and mixed to coat the popcorn with the caramel. The combined cost of the popcorn machine, cooking device and mixing machine can be substantial, particularly for the small business owners who are often involved in the production of caramel corn. Additionally, when using multiple containers for different steps, each transfer step requires care, skill, and time. Also, transferring hot candy materials between containers may cause the candy to cool more than is desirable during mixing. Accordingly, there is a need for a machine that can address these difficulties.

In one embodiment, a multi-purpose kettle configured in accordance with the present disclosure includes a generally cylindrical pot or kettle with a copper interior surface, and an agitator bar or stir assembly rotatably disposed at the bottom of the pot. In operation, popcorn kernels and oil are added to the kettle and the kettle is heated to a first temperature sufficient to pop the kernels to produce popcorn. During popping, the agitator bar in the kettle can ensure uniform cooking of the corn kernels and help prevent burning of the kernels or popcorn. The popcorn is then transferred to a holding container and candy or caramel ingredients (e.g., sugar and/or other ingredients) are added to the kettle. In some embodiments, the kettle can be cleaned at various stages of a particular cooking and/or mixing process (e.g., after the popcorn is removed from the kettle and prior to the addition of candy ingredients). The ingredients are then heated to a second temperature to form a liquid candy (e.g., caramel). The popcorn is then added back into the kettle and the kettle can be positioned at an angle. The agitator bar then rotates to mix the popcorn and caramel together and provide a generally uniform candy coating on the popcorn.

In one embodiment, the multi-purpose kettle can be positioned on a stand that includes one or more adjustment features. The adjustment features can position the kettle at one or more angles and/or enable the kettle to rotate to a "dumping" position. In some embodiments, positioning the kettle at an angle can aid the mixing process. Additionally, in several embodiments, the multi-purpose kettle can be part of a popcorn making device that includes a receiving table. For example, the stand can be attached to a table having a perforated surface for receiving hot caramel corn from the multi-purpose kettle and cooling the caramel corn. Furthermore, in some embodiments, the entire kettle can be constructed of copper, while in other embodiments a portion of the kettle can be constructed of another material (e.g., stainless steel) and the interior surface or a portion of the interior surface can be coated with copper. In other embodiments, only the bottom surface or cooking surface of the kettle can be copper. In still other embodiments, no portion of the kettle is copper. The stir assembly can include an L-shaped arm that substantially matches the shape of the bottom of the kettle such that the arm is configured to move the mixture at the bottom and/or bottom sides of the kettle.

Certain details are set forth in the following description and in FIGS. 1-8 to provide a thorough understanding of various embodiments of the disclosure. Other details describing well-known structures and systems often associated with popcorn machines, culinary and mixing equipment and methods for forming such parts (e.g., machining, forming, casting, polishing, finishing, etc.), as well as other cooking and mixing parts, assemblies and power sources, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure. Accordingly, other embodiments can have other details, dimensions, angles and/or portions without departing from the technology disclosed herein. In addition, further embodiments of the disclosure may be practiced without several of the details described below, while still other embodiments of the disclosure may be practiced with additional details and/or portions.

Figure 1:
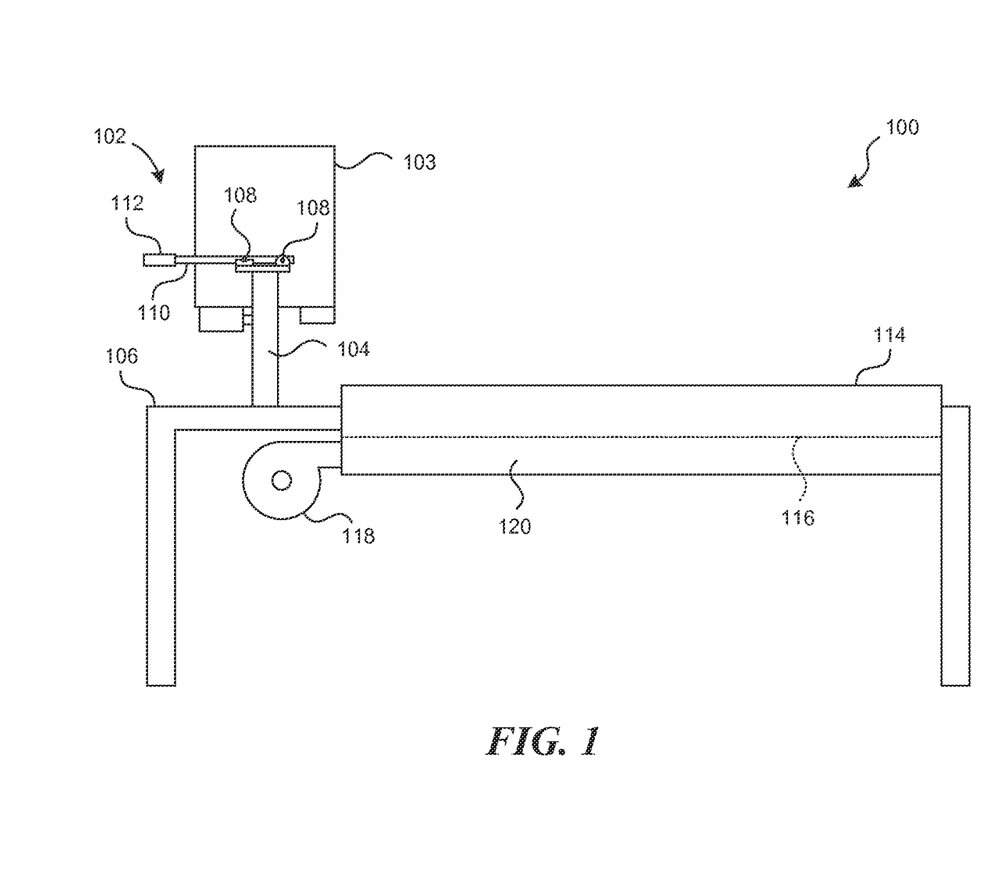
FIG. 1 is a side view of a candy popcorn making system having a multi-purpose kettle configured in accordance with an embodiment of the present disclosure.

FIG. 1 is a side view of a candy popcorn maker 100 having a multi-purpose kettle 102 configured in accordance with an embodiment of the disclosure. In the illustrated embodiment, the multipurpose kettle 102 includes a kettle body 103 positioned on a stand 104 that is attached to a receiving table 106. The kettle 102 can include four pins 108 (only two visible in FIG. 1) that can be fixedly attached to the body 103 to rotatably couple the kettle 102 to the stand 104. An arm 110 having a handle 112 can be coupled to the pins 108 to rotate the kettle 102, as further described below. The receiving table 106 can include a tray 114 having a perforated sheet 116 for receiving caramel corn. A fan 118 can blow air into a passageway 120 below the tray 114 and through the perforations in the tray 114 to cool the candy corn deposited thereon.

Figure 2:
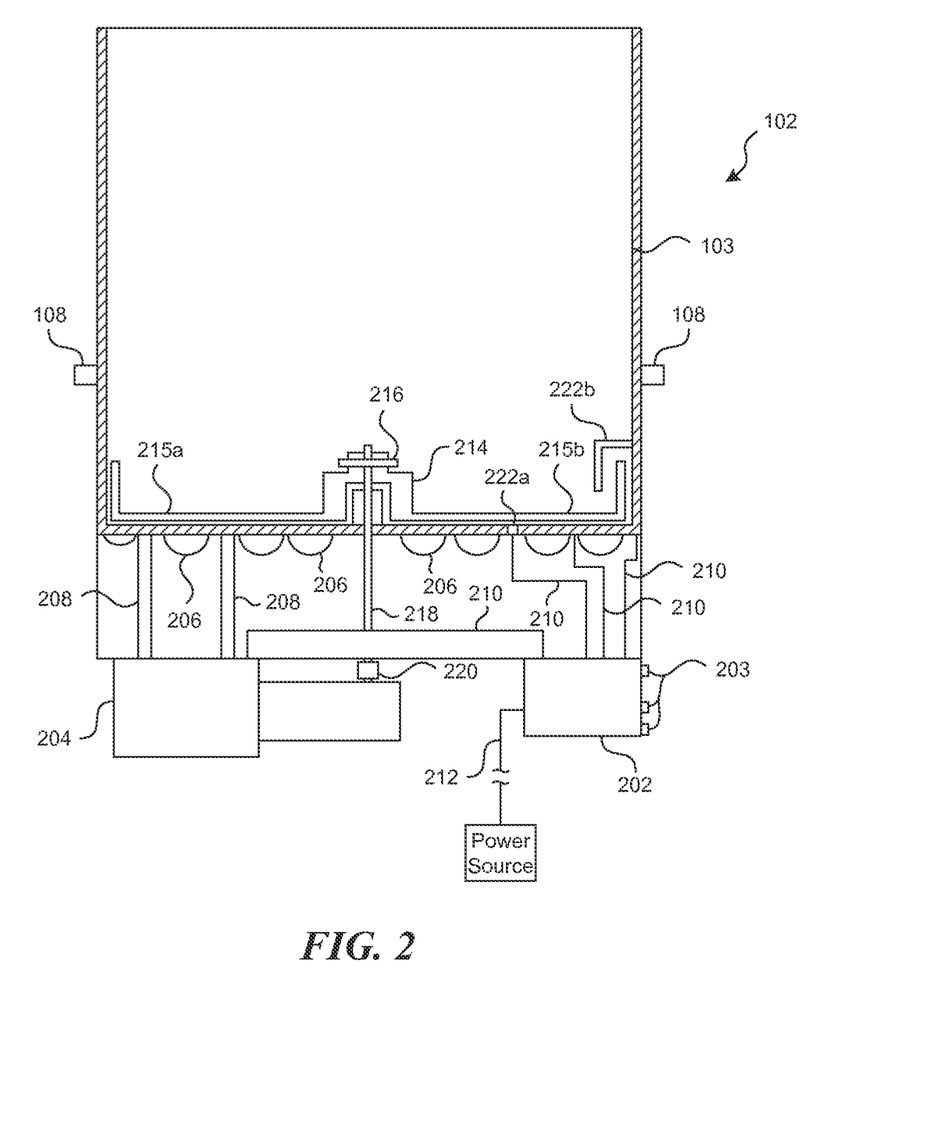
FIG. 2 is a cross-sectional side view of a multi-purpose kettle configured in accordance with an embodiment of the present disclosure.

FIG. 2 is a side view of the multi-purpose kettle 102 configured in accordance with an embodiment of the present disclosure. In the illustrated embodiment, the kettle 102 includes a control box 202, a mixer motor 204 (e.g., an electric motor), and a plurality of heating elements 206 (e.g., electrical heating elements). The mixer motor 204 can be operably coupled to the kettle 102 via bolts 208. An agitator 214 having opposing arms 215 (identified individually as a first arm 215a and a second arm 215b) extends adjacent to a bottom surface (i.e., a cooking or heating surface) of the kettle 102 and at least partially up the sidewall of the kettle 102. The agitator 214 can be operably coupled to the mixer motor 204 via a shaft 218, a shaft coupler 220, and a locking pin 216. A first thermocouple 222a can be positioned adjacent to the bottom surface of the kettle 102, and a second thermocouple 222b can be positioned to extend near the bottom surface of the kettle 102. The control box 202 can include a plurality of user control features 203 (e.g., switches, knobs, display screens, touch screens, power buttons, temperature controllers, etc.) and can be coupled to a power supply (e.g., a facility electrical outlet) via a power cord 212. Cables 210 (e.g., power and/or signal cables) can couple the control box 202 to the heating elements 206, the first thermocouple 222a, the second thermocouple 222b, and the mixer motor 204.

Figure 3:
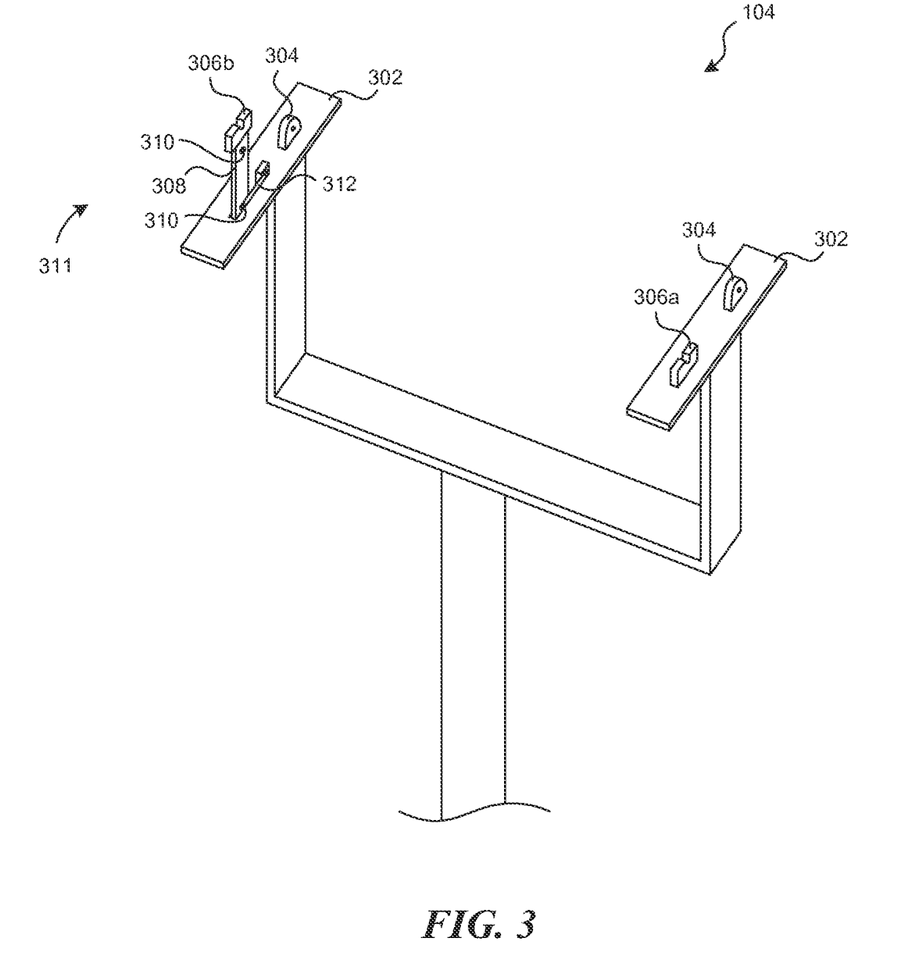
FIG. 3 is an isometric view of a kettle stand configured in accordance with an embodiment of the present disclosure.

A variety of stands can support the kettle 102 and provide for rotation of the kettle 102. FIG. 3 is an isometric view of the stand 104 configured in accordance with an embodiment of the present disclosure. In the illustrated embodiment, the stand 104 includes an adjustment feature 311 having support plates 302 with closed pin sockets 304 and open pin receivers 306 (identified individually as a first open pin receiver 306a and a second open pin receiver 306b). Two of the pins 108 on opposing sides of the kettle 102 (FIG. 2) can be rotatably received in corresponding closed pin sockets 304, and two of the pins 108 can be movably received in the open pin receivers 306a, b. The pins 108, the sockets 304, and the open pin receivers 306 provide for support and rotation of the kettle 102, as further described below. In the illustrated embodiment, the second open pin receiver 306b is adjustable via a locking pin 312 and an arm 308 having openings 310. Although the illustrated embodiment includes an adjustable open pin receiver 306b having the arm 308 and the locking pin 312, it is to be understood that kettles in accordance with the present technology can be supported and positioned via a variety of other adjustment features, devices or components. Additionally, in some embodiments, the first open pin receiver 306a can also be adjustable.

Figure 4:
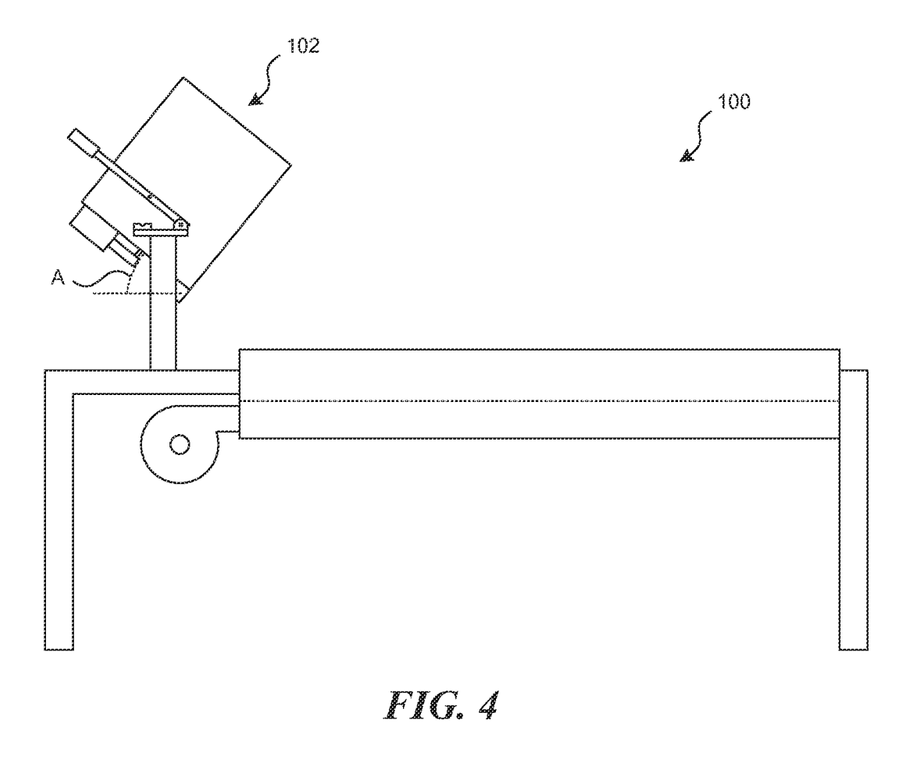
FIG. 4 is a side view of a candy popcorn maker having a multi-purpose kettle positioned for mixing in accordance with an embodiment of the present disclosure.
Figure 5:
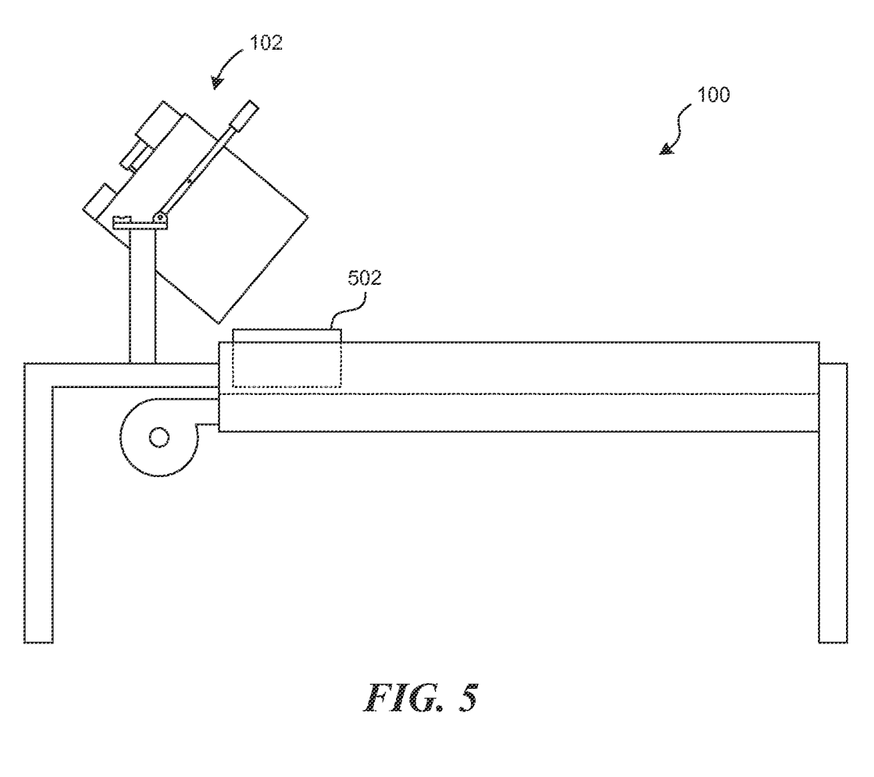
FIG. 5 is a side view of a candy popcorn making system having a multi-purpose kettle positioned for dumping popcorn or candy corn in accordance with an embodiment of the present disclosure.

FIG. 4 is a side view of the candy popcorn maker 100 with the multi-purpose kettle 102 positioned for mixing in accordance with an embodiment of the present disclosure. In the illustrated embodiment, the kettle 102 is positioned at a non-zero angle A from horizontal such that the heating surface of the kettle 102 is offset from horizontal by the angle A, and the sidewall of the kettle 102 is offset from vertical by the angle A. FIG. 5 is a side view of the candy popcorn maker 100 with the multi-purpose kettle 102 positioned for dumping popcorn or candy corn in accordance with an embodiment of the present disclosure. As shown in FIG. 5, a popcorn container 502 can be positioned to receive popcorn from the kettle 102.

Referring to FIGS. 1-5 together, in operation, the candy corn maker 100 can make candy corn in a multi-step process. First, oil and corn kernels can be added to the kettle 102 while the kettle 102 is in the upright position shown in FIG. 1. A user can energize the heating elements 206 and the mixer motor 204 via the control box 202 to heat the bottom surface of the kettle 102 to a first temperature for popping the corn (e.g., 450 degrees Fahrenheit) and to rotate the agitator 214 to ensure even heating and popping of the corn kernels. For example, the agitator can rotate near the bottom surface of the kettle 102 and move corn kernels and/or oil in a circular motion. The first thermocouple 222a can provide signals to the control box 202 to maintain the bottom surface of the kettle 102 at the first temperature via control of the heating elements 206. After the corn has popped, the user can de-energize the heating elements 206 and the mixer motor 204 and rotate the kettle via the handle 112 to the dump position shown in FIG. 5, dumping the popcorn into the popcorn container 502.

After the popcorn has been dumped, the kettle 102 can be returned to the upright position and ingredients for making candy (e.g., sugar) can be added to the kettle 102. The user can then energize the heating elements 206 and the mixer motor 204 via the control box 202 to heat the candy ingredients in the kettle 102 to a second temperature (e.g., 305 degrees Fahrenheit) and to rotate the agitator 214 to ensure even cooking of the ingredients. The second thermocouple 222b can provide signals to the control box 202 to maintain the candy at the second temperature via control of the heating elements 206. After the candy has been cooked (e.g., caramelized), the user can de-energize the heating elements 206 via the control box 202 and add the popcorn from the container 502 to the kettle 102. The user can then rotate the kettle 102 to the position shown in FIG. 4 for mixing. In particular, the user can rotate the kettle 102 via the handle 112 and position the adjustable open pin receiver 306b in an upward position to hold the kettle at the angle A shown in FIG. 4. In one embodiment, the angle A can be 30 degrees, or about 30 degrees. In other embodiments, the angle A may be more than 30 degrees or less than 30 degrees.

Positioning the kettle 102 at the angle A can improve the mixing of the popcorn and the caramel. For example, positioning the heating surface at a non-zero angle relative to horizontal can promote mixing as the popcorn and caramel "fall" across the kettle and are subsequently lifted via the arms 215. Additionally, while positioned at the angle A, gravity can increase the effectiveness of the portions of the arms 215 that extend partially up the sidewall of the kettle 102. Specifically, the ingredients are urged by gravity into contact with the upwardly extending portions of the arms 215 near a low point in the kettle 102, and the arms 215 can subsequently cause rolling and mixing of the mixture of popped corn and caramel. Lecithin oil can be added to the kettle 102 before or during mixing to encourage separation of the coated popcorn into individual pieces. When the mixture is evenly coated, the user can position the kettle in the dump position, dumping the caramel corn into the tray 114. The fan 118 can be energized to blow air through the sheet 116 and the caramel corn can be stirred until it is cooled.

Although embodiments described above can include operation of the control box 202 to independently select particular temperatures and independently energize the mixer motor 204, in other embodiments the control box 202 can include switches, knobs, or other selectable controls that enable multiple functions via a single switch or selection. For example, a switch, button or selectable display option for "Popcorn" can be provided. Selecting the Popcorn option can energize the heating elements 206 to the first temperature for a particular amount of time and energize the mixer motor 204 for a particular amount of time. Similarly, a "Caramel" selection can be provided that energizes the heating elements 206 to heat candy to the second temperature for a particular amount of time and energize the mixer motor 204 for a particular amount of time. Additionally, a "Caramel Corn" or "Candy Corn" selection can be provided to energize the mixer motor to mix popped popcorn and caramel for a particular amount of time. Furthermore, a variety of additional settings and controls can be used to operate multi-purpose kettles configured in accordance with the present disclosure. For example, switches, buttons or selectable options having different names can activate the motor 204, the heaters 206 and/or other components.

Figure 6:
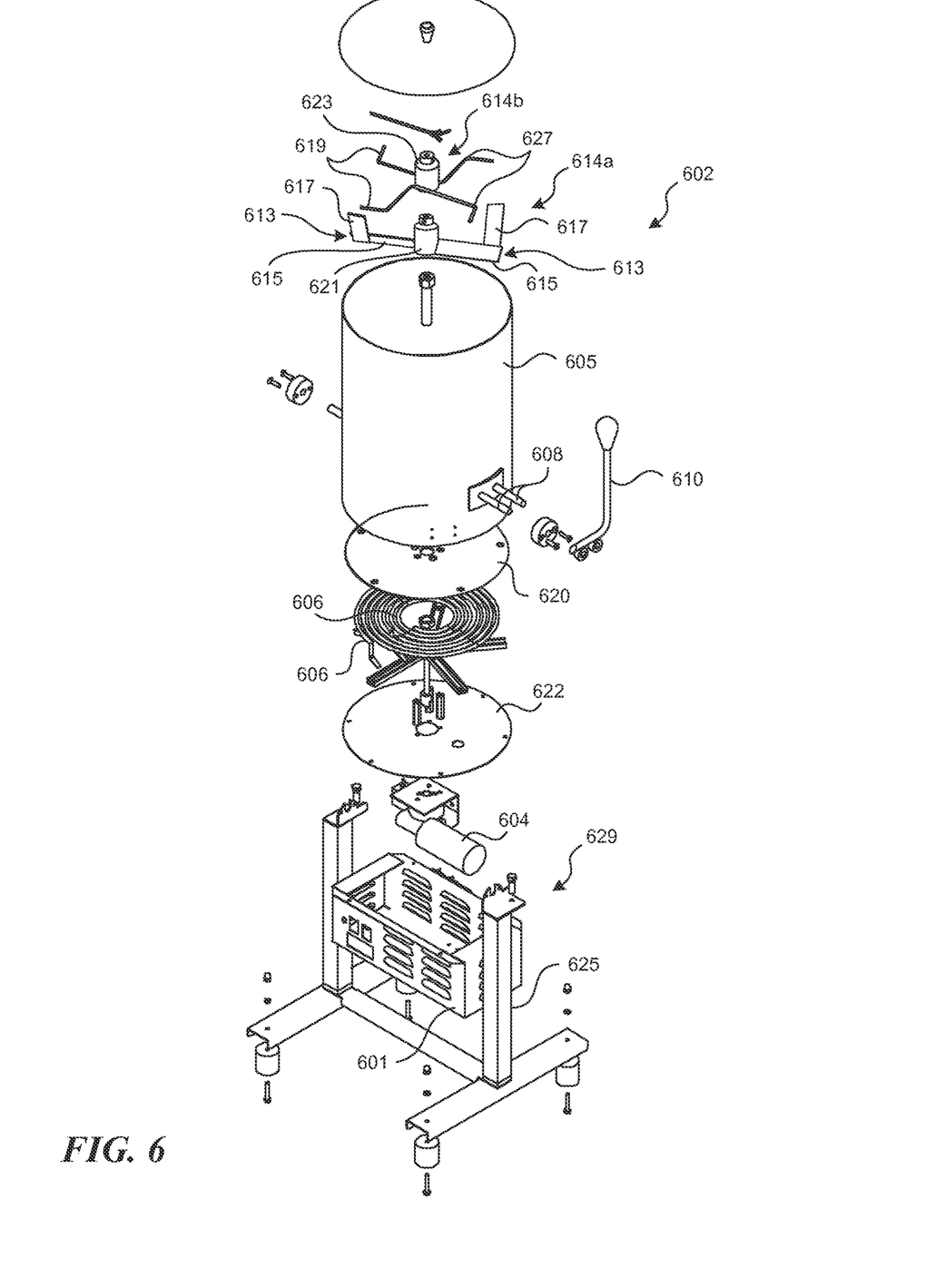
FIG. 6 is an exploded isometric view of a multi-purpose kettle configured in accordance with an embodiment of the present disclosure.

Further to the features described above, multi-purpose kettles configured in accordance with the present disclosure can include additional and/or alternative features. For example, in several embodiments, multi-purpose kettles can include multiple stir assemblies that can be configured to stir popcorn, candy ingredients, popcorn and candy ingredients, and/or other ingredients or food items. FIG. 6 is an exploded isometric view of a multi-purpose kettle 602 configured in accordance with an embodiment of the present disclosure. Similar to the multi-purpose kettle 102 described above with reference to FIGS. 1, 2, 4 and 5, the multi-purpose kettle 602 includes, among other components, a body 605, pins 608, a motor 604, a plurality of heating elements 606, a handle 610, and a stand 625. Additionally, in the illustrated embodiment, the kettle 602 includes a diffuser plate 620 and a bottom cover 622. The heating elements 606 are attached to an underside of the diffuser plate 620, which is coupled to the body 605. The bottom cover 622 encloses the heating elements 606 as well as other components positioned below the diffuser plate 620. In the illustrated embodiment of FIG. 6, the kettle 602 also includes a housing 601 that encloses the motor 604.

The kettle 602 includes a first stir assembly 614a and a second stir assembly 614b (collectively, the stir assemblies 614). The stir assemblies 614 can be rotatably positioned within the kettle 602 and operably coupled to the motor 604 via a shaft. For example, in one embodiment, the second stir assembly 614b is positioned in the kettle during the popping of corn, and the first stir assembly 614a is positioned in the kettle during the cooking of caramel and the mixing of popcorn and caramel. In other embodiments, the first stir assembly 614a can be positioned in the kettle during the popping of popcorn and during the mixing of popcorn and caramel. Additionally, although the stir assemblies 614 are referred to above as a first stir assembly 614a and a second stir assembly 614b, it is to be understood that the numerical identifiers (i.e., first and second) are arbitrary and are not necessarily indicative of an order of use. Additionally, as used herein, the numerical identifiers may be swapped. That is, the first stir assembly 614a may be referred to as a second stir assembly, and the second stir assembly 614b may be referred to as a first stir assembly.

The first stir assembly 614a includes a first stir hub 621 and a plurality of stir blades 613. The stir blades 613 include horizontal portions 615 and vertical portions 617. The horizontal portions 615 are operably coupled to, and extend outwardly from, the first stir hub 621. The vertical portions 617 extend from the corresponding horizontal portions 615. Although the blade portions 615 and 617 are referred to as horizontal and vertical, respectively, the blade portions 615 and 617 do not necessarily extend in a purely horizontal or vertical direction. For example, in the illustrated embodiment, the vertical portions 617 extend at an angle between horizontal and vertical. Similarly, although the horizontal portions 615 extend horizontally from the first stir hub 621, the horizontal portions 615 in the illustrated embodiment are rotated at an angle that matches that of the vertical portions 617.

In addition to the illustrated embodiments, stir blades in accordance with the present disclosure can include one or more portions that can extend at a variety of angles. In several embodiments, the horizontal portions 615 can be positioned adjacent or directly adjacent to the bottom surface of the kettle 602 such that movement of the horizontal portions 615 moves and mixes any material resting on the bottom surface of the kettle 602. The vertical portions 617 can be similarly positioned adjacent or directly adjacent to the sidewall of the kettle 602 to move and mix any ingredients positioned against the sidewall.

The second stir assembly 614b includes a plurality of stir wires 619 that are operably coupled to a second stir hub 623 and extend therefrom. In the illustrated embodiment, the stir wires 619 include a plurality of wire bends 627. The wire bends 627 can provide a shape to the stir wires 619 that improves their ability to mix and/or agitate ingredients placed in the kettle 602. For example, the wire bends 627 can provide a shape to the stir wires 619 that provides for mixing and/or movement of ingredients along the bottom surface or cooking surface of the kettle 602. In particular, in the illustrated embodiment, the wire bends 627 provide a "hook" shape to the stir wires 619. This hook shape can "catch" corn kernels along the bottom surface of the kettle 602 and push them in a generally radial path as the stir wires 619 rotate.

Figure 7:
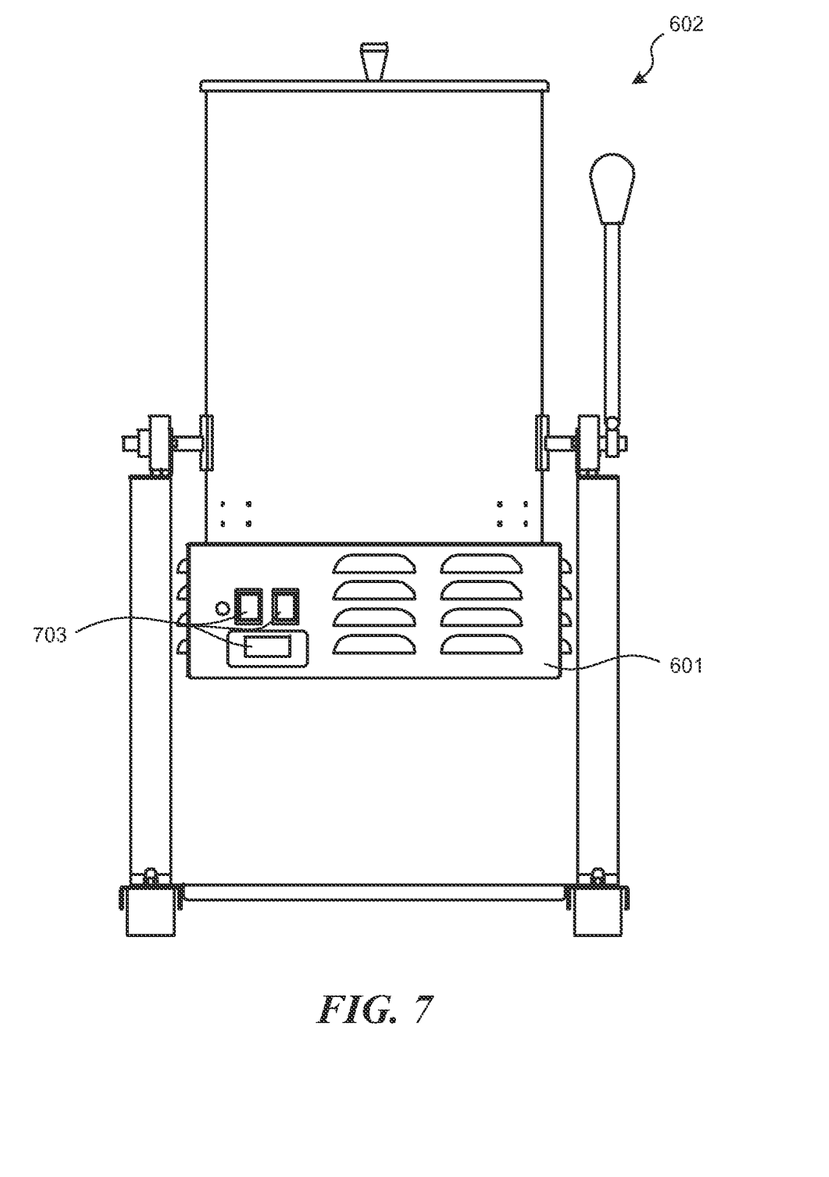
FIG. 7 is a side view of the multi-purpose kettle of FIG. 6.

FIG. 7 is a side view of the multi-purpose kettle 602 of FIG. 6. In the illustrated embodiment of FIG. 7, the housing 601 includes a plurality of user control features 703 (e.g., switches, knobs, display screens, touch screens, power buttons, temperature controllers, etc.). Similar to user control features 203 described above with reference to the kettle 102 shown in FIG. 2, the user control features 703 can be coupled to a power supply (e.g., a facility electrical outlet)

via a power cord. Additionally, cables (e.g., power and/or signal cables) can couple the user control features to the heating elements 606, the motor 604, one or more thermocouples and/or other components.

Figure 8:
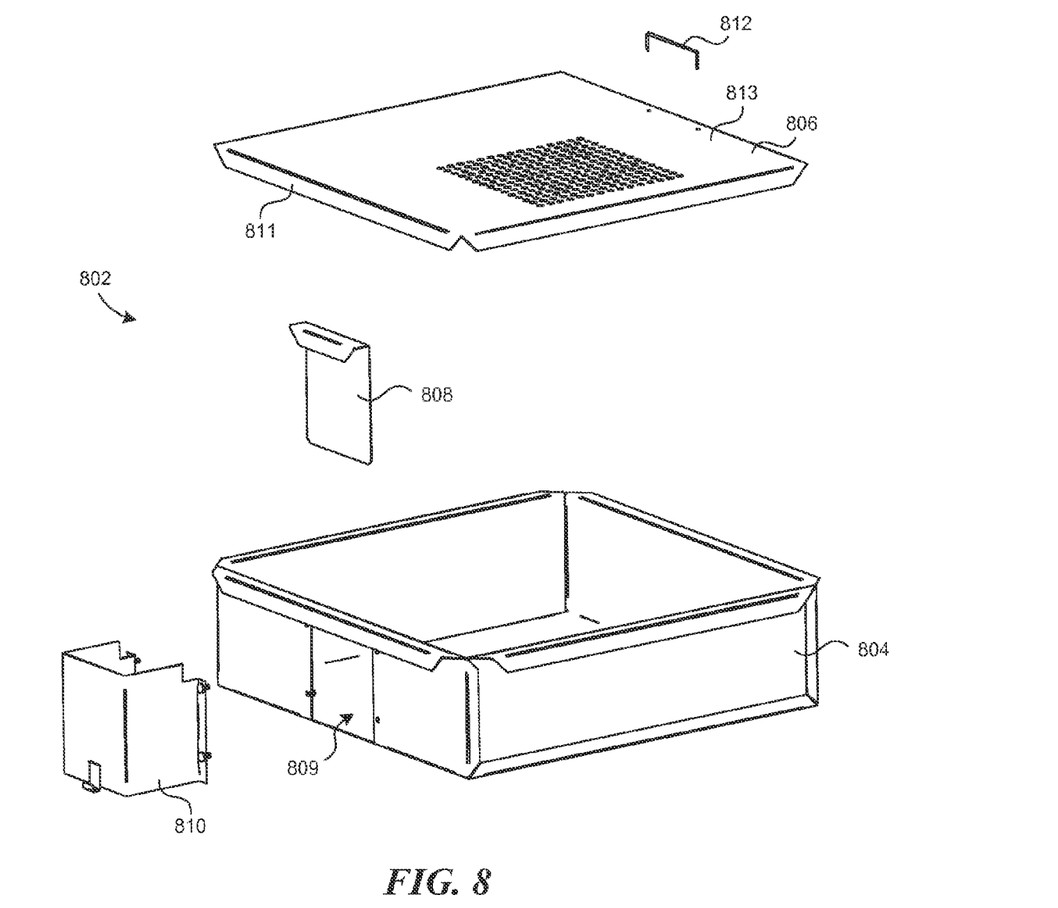
FIG. 8 is an exploded isometric view of a receiving tray configured in accordance with an embodiment of the present disclosure.

FIG. 8 is an exploded isometric view of a receiving tray 802 configured in accordance with an embodiment of the present disclosure. In the illustrated embodiment, the receiving tray 802 includes a housing 804 and a perforated sheet 806. A chute 810 is fixedly attached to the housing 804 adjacent to an opening 809 in the housing 804. A door 808 is removably and/or slidably attached to the housing 804 to block the opening 809. The perforated sheet 806 can be rotatably positioned within the housing 804. Specifically, the perforated sheet 806 can rotate upwardly about a first end 811 when it is lifted via a handle 812 at a second end 813. As described further below, lifting the perforated sheet 806 can move candy corn from the perforated sheet 806 through the opening 809 and into the chute 810.

Similar to the kettle 102 described above with reference to FIGS. 1-5, the kettle 602 and the receiving tray 802 can produce candy corn in a multi-step process. For example, referring to FIGS. 6-8 together, oil and corn kernels can be added to the kettle 602 while the kettle 602 is in an upright position with the second stir assembly 614b coupled to the motor 604. A user can energize the heating elements 606 and the motor 604 via the user controls 703 to heat the bottom surface of the kettle 602 to a first temperature for popping the corn (e.g., 450 degrees Fahrenheit) and to rotate the second stir assembly 614b. The stir wires 619 can rotate to move and mix the oil and the corn kernels and ensure even heating and popping of the corn kernels. The wire bends 627 and the hook shape of the stir wires 619 can capture corn kernels near the sidewall as well as along the bottom surface, helping to reduce the likelihood than any corn kernels remain stationary within the kettle 602 for any significant amount of time. Additionally, one or more thermocouples can provide signals that can be used to maintain the bottom surface of the kettle 602 at the first temperature via control of the heating elements 606. After the corn has popped, the user can de-energize the heating elements 606 and the motor 604, and rotate the kettle 602 via the handle 610 to dump the popcorn into a receiving container (e.g., the receiving container 502 shown in FIG. 5).

After the popcorn has been dumped, the kettle 602 can be returned to an upright position and the second stir assembly 614b can be removed. The first stir assembly 614a can subsequently be coupled to the motor 604, and ingredients for making candy (e.g., sugar, flavoring, etc.) can be added to the kettle 602. The user can then energize the heating elements 606 and the motor 604 via the user control features 703 to heat the candy ingredients in the kettle 602 to a second temperature (e.g., 305 degrees Fahrenheit) and to rotate the first stir assembly 614a to ensure mixing and even cooking of the ingredients. One or more thermocouples can provide signals that can be used to maintain the candy at the second temperature via control of the heating elements 606.

After the candy has been cooked (e.g., caramelized), the user can de-energize the heating elements 606 via the user control features 703 and add the popcorn from the container 502 to the kettle 602. The user can then energize the motor 604 to mix the popcorn and the caramel via the first stir assembly 614a. In some embodiments, the kettle 602 can be positioned at an angle while mixing the popcorn and caramel (similar to the mixing described above with respect to the kettle 102). In other embodiments, the kettle 602 can mix the popcorn and caramel while the kettle 602 is upright. Regardless of the angle of the kettle 602, the first stir assembly 614a can provide for thorough mixing of the popcorn and the caramel. In particular, the horizontal portions 615 of the stir blades 613 can move and lift caramel from the bottom of the kettle 602, while the vertical portions 617 can move caramel inwardly from the sidewall of the kettle 602. Accordingly, the horizontal portions 615 and the vertical portions 617 can help to ensure that the popcorn and the caramel are thoroughly mixed, and that little or no caramel or popcorn sticks to the bottoms or sides of the kettle 602.

After mixing, the caramel corn can be dumped from the kettle 602 into the receiving tray 802 for cooling and drying. The door 808 can initially be positioned to block the opening 809 to prevent candy corn from exiting the housing 804 and falling through the chute 810. A fan can blow air through the perforated sheet 806 to cool and dry the candy corn in a manner similar to the operation of the tray 114 described above. Subsequently, the door 808 can be removed or slid to a side to expose the opening 809, and the perforated sheet 806 can be lifted at the second end 813 via the handle 812. As the second end 813 is lifted, the perforated sheet 806 rotates upwardly about the first end 811, and the candy corn slides down the perforated sheet 806, through the opening 809 and falls through the chute 810 into a receiving container.

In addition to making candy corn or caramel corn, multipurpose kettles in accordance with the present disclosure can produce other types of flavored popcorn. In one embodiment, the multi-purpose kettles 102 and 602 can be used to produce cheese corn. Specifically, in a manner similar to the methods and/or procedures described above, the kettles 102 or 602 can be used to pop popcorn which can be transferred to a container. Cheese or cheese ingredients can subsequently be added to the kettle 102 or 602 and heated to approximately 120 degrees Fahrenheit while being mixed. The popped corn can then be placed in the kettle and mixed with the cheese or cheese ingredients to produce cheese corn.

Figure 9A:
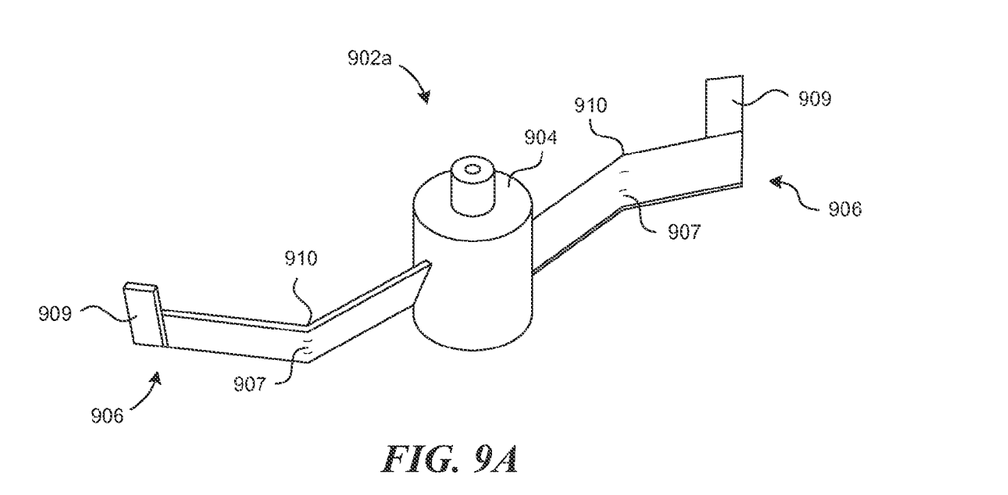
FIGS. 9A-9C are isometric views of stir assemblies configured in accordance with embodiments of the present disclosure.
Figure 9B:
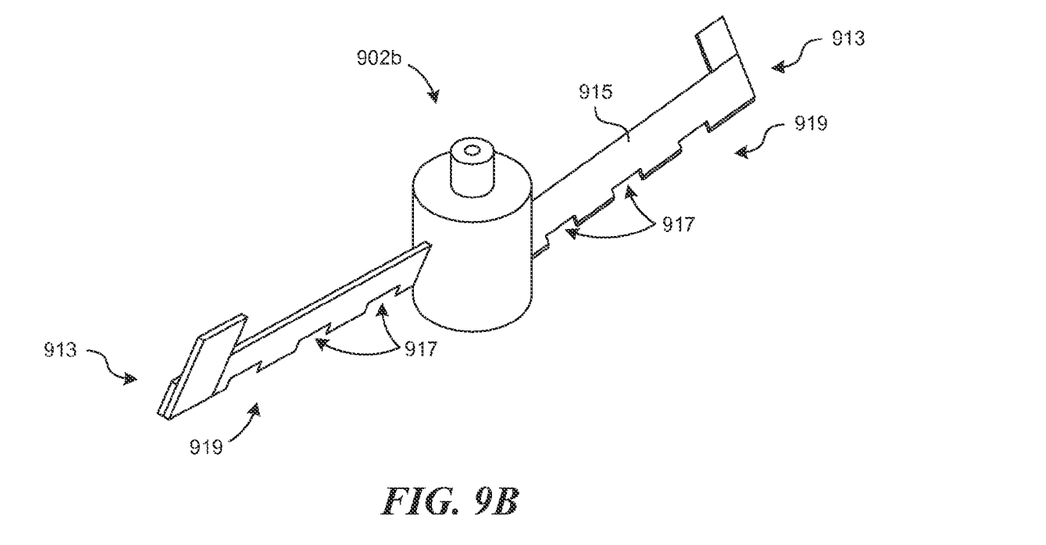
Figure 9C:
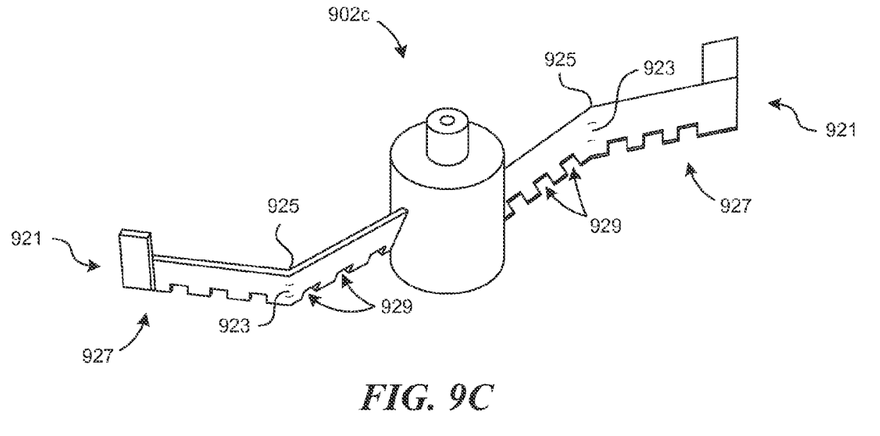

In addition to the stir assemblies described above, other stir assemblies configured in accordance with the present technology can have features that provide for stirring of popcorn kernels, stirring of candy ingredients, and/or mixing of popcorn and candy ingredients. FIGS. 9A-9C are isometric views of stir assemblies 902 (identified individually as stir assemblies 902a, 902b and 902c) configured in accordance with the present technology. In the illustrated embodiment of FIG. 9A, the stir assembly 902a includes a hub 904 and two stir blades 906. The stir blades 906 include horizontal portions 907 and vertical portions 909. The horizontal portions 907 include bends 910 that provide an angled shape to the horizontal portions 907. In several embodiments, the bends 910 can improve the operation of the stir assembly 902a with respect to the stirring of popcorn kernels. In particular, the bends 910 can provide for improved movement and mixing of the corn kernels along the bottom surface of the multipurpose kettle 102 or 602. Additionally, similar to the first stir assembly 614a described above with respect to FIGS. 6-8, the stir assembly 902a can stir candy ingredients (e.g., caramel ingredients), and stir and mix candy ingredients with popcorn. In particular, the horizontal portions 907 of the stir blades 906 can move and lift caramel and/or popcorn from the bottom of the kettle 102 or 602, while the vertical portions 909 can move caramel and/or popcorn inwardly from the sidewall of the kettle 102 or 602. Accordingly, in addition to stirring popcorn kernels during a popping cycle, the stir assembly 902a can stir candy ingredients during a cooking cycle, as well as mix popcorn and candy ingredients subsequent to the popping cycle and cooking cycle.

In the illustrated embodiment of FIG. 9B, the stir assembly 902b includes two serrated stir blades 913. In particular, horizontal portions 915 of the stir blades 913 include a plurality of cutouts 917 forming serrated lower edges 919. The serrated lower edges 919 can aid in stirring of popcorn kernels during popping operations within the kettle 102 or 602. Specifically, the cutouts 917 can reduce the buildup of corn kernels in front of the rotating stir blades 913, evening out the stirring of the corn kernels and allowing more corn kernels to maintain contact with the cooking surface of the kettle 102 or 602.

FIG. 9C illustrates a stir assembly 902c having features at least generally similar to those of the stir assemblies 902a and 902b. In particular, in the illustrated embodiment, the stir assembly 902c includes stir blades 921 having horizontal portions 923 with bends 925, and cutouts 929 forming serrated lower edges 927. In several embodiments, the stir assembly 902c can provide the advantages described above with respect to FIGS. 9A and 9B.

As described above, the stir assemblies 902 can provide improved performance with respect to the stirring of popcorn kernels during a popping cycle in the kettles 102, 602. Additionally, each of the stir assemblies 902 can stir candy ingredients (e.g., caramel ingredients) during a cooking cycle, and stir and mix candy ingredients with popcorn in a manner at least generally similar to that described above with respect to the stir assemblies 614a and 902a. By performing multiple functions, the stir assemblies 902, and other stir assemblies configured in accordance with the present disclosure, can enable a multi-purpose kettle to prepare candy corn without switching stir assemblies.

From the foregoing, it will be appreciated that specific embodiments of the disclosure have been described herein for purposes of illustration, but that various modifications may be made without deviating from the various embodiments of the disclosure and associated technology. For example, although embodiments described above include first stir assemblies 614a having stir blades 613 with horizontal portions 615 and vertical portions 617, other embodiments can include stir blades having fewer or additional portions that extend at alternative angles. Additionally, stir blades 613 in accordance with the present disclosure can be constructed from multiple components that are welded, brazed, fastened or otherwise coupled together, or can be constructed from single components that are bent or shaped to include one or more portions that provide for stirring of corn kernels, oil, candy ingredients and/or candy corn (e.g., one or more horizontal, vertical or other blade portions or blades). Additionally, while various advantages associated with certain embodiments of the disclosure have been described above in the context of those embodiments, other embodiments may also exhibit such advantages, and not all embodiments need necessarily exhibit such advantages to fall within the scope of the disclosure. Furthermore, certain aspects of the foregoing disclosure described in the context of particular embodiments may be combined or eliminated in other embodiments. The following claims are directed to various embodiments of the disclosure.

I claim:

1. A multi-purpose kettle for popping popcorn, cooking candy ingredients and mixing the popcorn and candy ingredients, the multi-purpose kettle comprising:
   a stand;
   a kettle body rotatably mounted to the stand and having a heating surface and a sidewall, wherein the kettle body is rotatable from an upright position to a dump position, wherein the stand includes an adjustment feature for positioning the kettle in a mixing position with the heating surface at a non-zero angle relative to horizontal, and wherein the adjustment feature releasably locks the kettle in the mixing position;
   a heating element positioned to heat the heating surface;
   a first stir assembly removably and rotatably positionable within the kettle body and having at least one stir blade, the at least one stir blade having a horizontal portion and a vertical portion, wherein the horizontal portion is positioned to extend adjacent to the heating surface, wherein the vertical portion is positioned to extend adjacent to the sidewall, and wherein the first stir assembly is configured to be positioned within the kettle body during cooking of candy ingredients and mixing of popcorn with candy ingredients; and
   a second stir assembly removably and rotatably positionable within the kettle body and having at least one stir wire, wherein the at least one stir wire includes at least one wire bend, wherein the second stir assembly is configured to be positioned within the kettle body in place of the first stir assembly for popping of popcorn and wherein the first stir assembly and the second stir assembly are operably coupleable to a motor positioned to rotate the first stir assembly or the second stir assembly.

2. A multi-purpose kettle for popping popcorn, cooking candy ingredients and mixing the popcorn and candy ingredients, the multi-purpose kettle comprising:
   a stand;
   a kettle body rotatably mounted to the stand and having a heating surface and a sidewall, wherein the kettle body is rotatable from an upright position to a dump position, wherein the stand includes an adjustment feature for positioning the kettle in a mixing position with the heating surface at a non-zero angle relative to horizontal, and wherein the adjustment feature releasably locks the kettle in the mixing position;
   a heating element positioned to heat the heating surface;
   a stir assembly rotatably positioned within the kettle body and having at least one stir blade, the at least one stir blade having a horizontal portion and a vertical portion, wherein the horizontal portion is positioned to extend adjacent to the heating surface, and wherein the vertical portion is positioned to extend adjacent to the sidewall; and
   a control panel operable to (a) energize the heating element to heat the heating surface to a first temperature to pop popcorn, and (b) energize the heating element to heat the heating surface to a second temperature, lower than the first, to cook candy ingredients.

3. The multi-purpose kettle of claim 2, further comprising a plurality of pins extending from and fixedly attached to the kettle body, and wherein the kettle body is rotatably mounted to the stand via the pins.

4. The multi-purpose kettle of claim 2 wherein the kettle includes an internal diameter and the stir blade includes an overall length at the vertical portion, and wherein the overall length is substantially similar to the internal diameter.

5. A candy popcorn system comprising:
   a multi-purpose kettle including:
      a stand;
      a kettle body for popping popcorn and cooking candy, wherein the kettle body is rotatably mounted to the stand and includes a bottom surface and a sidewall;
      a heating element positioned to heat the bottom surface;
      a stir assembly rotatably positioned within the kettle body to stir popcorn and candy ingredients, wherein the stir assembly includes at least one stir blade, the at least one stir blade having a horizontal portion and a vertical portion; and
      a control panel operable to energize the heating element to heat the bottom surface to a first temperature to pop the popcorn and a second temperature to cook the candy ingredients; and a receiving tray positionable proximate to the kettle stand to receive candy popcorn, the receiving tray having a perforated sheet with a plurality of perforations, wherein the perforations are positioned to provide airflow to candy popcorn on the perforated sheet.

6. The multi-purpose kettle of claim 5 wherein the stand includes an adjustment feature for positioning the kettle body with the sidewall at a non-zero angle to vertical.

7. The candy popcorn system of claim 5 wherein the stir assembly is a first stir assembly, and wherein the candy popcorn system further comprises:
   a motor, wherein the first stir assembly is removably coupleable to the motor for cooking of the candy ingredients and mixing of the popcorn and the candy ingredients; and
   a second stir assembly having a stir wire, wherein the second stir assembly is removably coupleable to the motor and rotatably positionable within the kettle body in place of the first stir assembly to stir popcorn kernels and popcorn.

8. The candy popcorn system of claim 7 wherein the stir wire includes a wire bend.

9. The candy popcorn system of claim 5 wherein the multi-purpose kettle further includes a motor operably coupled to the stir assembly, and wherein the control panel further includes:
   a first user control feature operable to energize the heating element and the motor for a first amount of time to pop and stir popcorn;
   a second user control feature operable to energize the heating element and the motor for a second amount of time to cook and stir the candy ingredients; and
   a third user control feature operable to energize the motor for a third amount of time to mix the popcorn and candy ingredients.

10. The candy popcorn system of claim 5 wherein the kettle body is rotatable from an upright position to a dump position.

11. A candy popcorn system comprising:
   a multi-purpose kettle including:
      a stand;
      a kettle body for popping popcorn and cooking candy, wherein the kettle body is rotatably mounted to the stand and includes a bottom surface and a sidewall;
      a heating element positioned to heat the bottom surface; and
      a stir assembly rotatably positioned within the kettle body to stir popcorn and candy ingredients, wherein the stir assembly includes at least one stir blade, the at least one stir blade having a horizontal portion and a vertical portion, wherein the horizontal portion is positioned to extend adjacent to the bottom surface, and wherein the vertical portion is positioned to extend adjacent to the sidewall; and
   a receiving tray positionable proximate to the kettle stand to receive candy popcorn, the receiving tray having a perforated sheet with a plurality of perforations, wherein the perforations are positioned to provide airflow to candy popcorn on the perforated sheet, wherein the receiving tray includes a housing having an opening extending into a chute, and wherein the perforated sheet is rotatably positioned within the housing to direct candy corn through the opening and into the chute; and
   a control panel operable to energize the heating element to heat the bottom surface to a first temperature to pop the popcorn and a second temperature, lower than the first temperature, to cook the candy ingredients.

* * * * *